United States Patent [19]

Shiota

[11] Patent Number: 4,794,460

[45] Date of Patent: Dec. 27, 1988

[54] APPARATUS FOR RECORDING IMAGE EXACTLY CORRESPONDING TO ONE DISPLAYED ON VIDEO MONITOR

[75] Inventor: Kazuo Shiota, Kaisei, Japan

[73] Assignee: Fuji Photo Film Co., Ltd., Kanagawa, Japan

[21] Appl. No.: 54,875

[22] Filed: May 27, 1987

[30] Foreign Application Priority Data

May 28, 1986 [JP] Japan .................. 61-121171

[51] Int. Cl.⁴ .................. H04N 5/84; H04N 9/79
[52] U.S. Cl. .................. 358/244; 358/332; 358/345
[58] Field of Search .............. 358/76, 80, 244, 244.1, 358/244.2, 302, 332, 333, 345–348; 346/110 R; 354/75, 76

[56] References Cited

U.S. PATENT DOCUMENTS

| | | | |
|---|---|---|---|
| 4,335,399 | 6/1982 | Matsumoto | 358/80 |
| 4,368,484 | 1/1983 | Stemme et al. | 358/332 X |
| 4,473,849 | 9/1984 | Cool | 358/244 X |
| 4,520,403 | 5/1985 | Burkhardt et al. | 358/332 |
| 4,694,356 | 9/1987 | Constable | 358/244 X |
| 4,730,214 | 3/1988 | Lambert | 358/244 X |

Primary Examiner—W. B. Perkey
Attorney, Agent, or Firm—Birch, Stewart, Kolasch & Birch

[57] ABSTRACT

An image recording apparatus includes an image processor for achieving an image processing on an input video signal, a recorder for recording on a photosensitive material an image represented by the video signal processed by the image processor, a display for displaying an image represented by the video signal processed by the image processor, a storage for storing a first image processing parameter determined according to a sensitivity characteristic of the photosensitive material and a second image processing parameter determined according to a display characteristic of the display, an input device for entering an instruction, and a controller responsive to the input device for controlling the image processor, the recorder, the display, and the storage. The controller sets values of the second image processing parameter in the image processor to cause the display to display an image, and also sets in the image processor values of the first image processing parameter related with a predetermined relationship to the second image processing parameter set in the image processor, thereby causing the recorder to conduct a recording operation on the photosensitive material.

4 Claims, 7 Drawing Sheets

APPARATUS FOR RECORDING IMAGE EXACTLY CORRESPONDING TO ONE DISPLAYED ON VIDEO MONITOR

BACKGROUND OF THE INVENTION

1. Field of the Invention

The present invention relates to an image recording apparatus, and in particular, to an image recording apparatus which records a visual image on an image recording medium from a video signal representing a still picture.

2. Description of the Prior Art

There has been proposed, for example, a still image recording apparatus which receives an image signal read out from a video signal recording medium such as a floppy disk, a video tape, or the like and reproduces a visual image on an image recording medium such as a sheet of photosensitive paper. Conventionally, however, in this kind of apparatus a video monitor such as a CRT is not provided, or otherwise a video monitor is included to allow the content of an input image to be viewed. When recording images on photosensitive paper in sequence, if it is required to effect correction of images by setting image processing parameters, such as color tone and gradation to optimal values through visual inspection of images to be recorded on an image monitoring unit, then the monitor is desired to reproduce images accurately corresponding to hard copy images to be recorded on a photosensitive sheet.

A type of recorder of the image recording apparatus includes, for example, a monochromatic CRT having a high brightness display screen on which color-separated images are displayed to be focused on a sheet of print paper through color filters associated with decomposed colors. As well known in photography, the law of subtractive color mixture applies to color reproduction on photosensitive materials, namely, photosensitive dyes, cyan (C), magenta (M) and yellow (Y), are used to compose a color picture; whereas, color reproduction on a CRT screen is conducted according to the law of additive color mixture by which visual radiations from red (R), green (G) and blue (B) phosphor particles are used to form a composite color picture. In general, photosensitive dyes are incomplete in spectral characteristics as compared to luminescent characteristics of a fluorescent material. Consequently, when the same processing is applied to produce images on photographic paper and a phosphor screen, a hard copy image may be lower in chroma saturation than a CRT image.

Moreover, the total gradation characteristics established by a recording CRT and photosensitive paper may not match with those associated with a CRT of a video monitor. In the conventional recording apparatus, consequently, the color tone and the gradation of an image to be printed on a photosensitive sheet are not reproduced with fidelity on a video monitor system. As a consequence, ween recording an image on a print sheet of paper, an experienced skill has been required to record a high-quality image. For example, an operator has to attend to correction operation with differences in gradation between an image displayed on a video monitor and one printed on photosensitive paper taken into account.

SUMMARY OF THE INVENTION

It is therefore an object of the present invention to provide an image recording apparatus in which a monitor image is accurately matched with a hard copy image, thereby removing the disadvantages of the prior art technology.

According to the present invention, there is provided an image recording apparatus comprising image processing means for processing an input video signal, recording means for recording on a photosensitive material the video signal processed by the image processing means, display means for displaying an image represented by the processed video signal, store means for storing a first image processing parameter determined according to a sensitivity characteristic of the photosensitive material and a second image processing parameter determined according to a display characteristic of the display means, input means for receiving an instruction, and control means responsive to the input means for controlling the image processing means, the recording means, the display means, and the store means, the control means setting a value of the second image processing parameter in the image processing means to cause the video display means to display an image, and setting a value of the first image processing parameter having a predetermined relationship with the value of the second image processing parameter set in the image processing means to thereby cause the recording means to effect a recording operation on the photosensitive material.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, embodiments of the image recording apparatus of the present invention will be described in detail.

Figure 1:
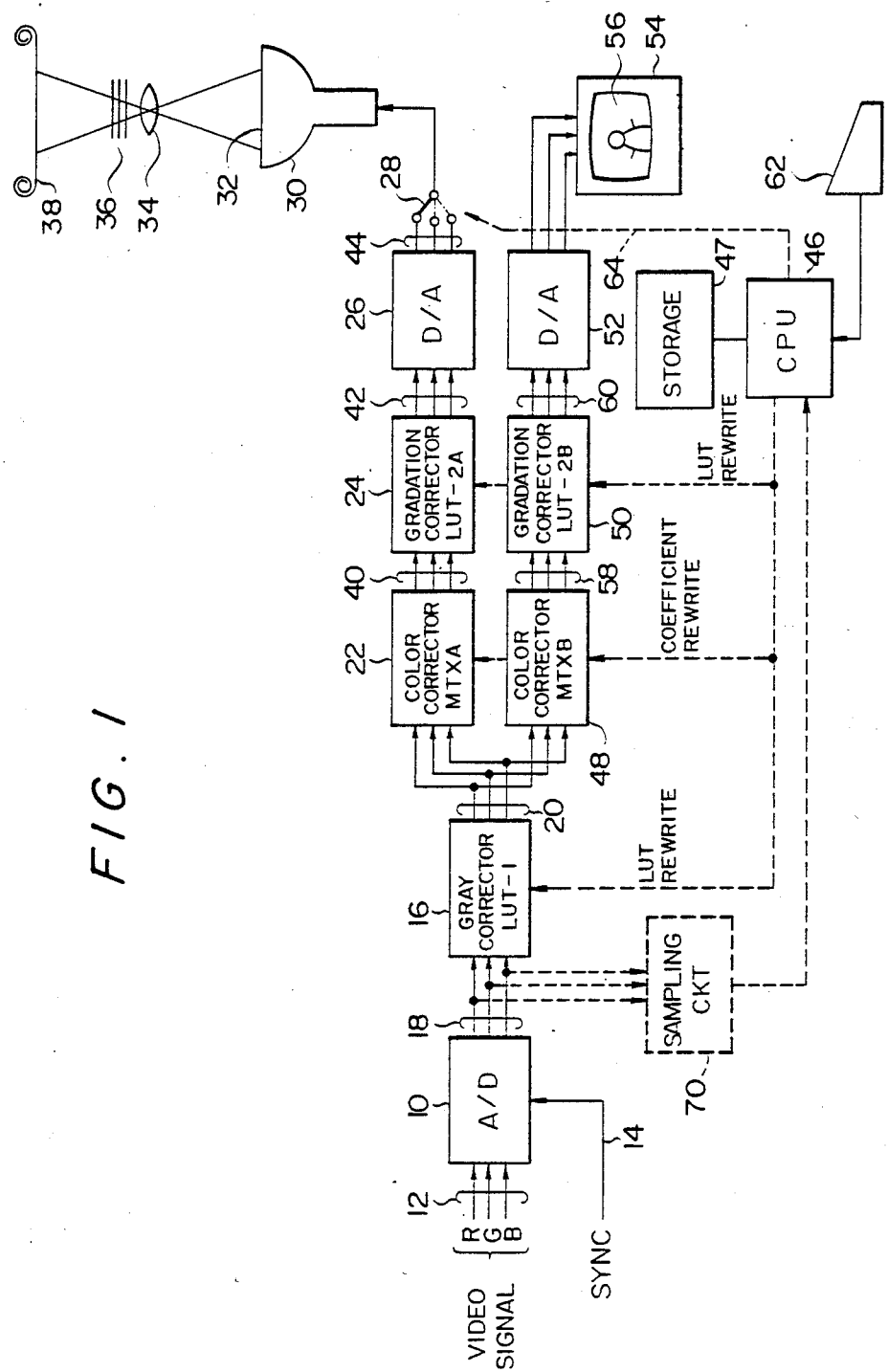
FIG. 1 is a schematic block diagram showing an embodiment of an image recording apparatus according to the present invention.

In the embodiment of FIG. 1, signals of three primary colors R, G, and B of a video signal from a video signal source such as a video floppy disk playback system are supplied to an input 12 of an analog-to-digital (A/D) converter 10. The A/D converter 10 has an input 14 to which a synchronizing signal SYNC is supplied. In response to this signal SYNC, the A/D converter circuit 10 oonverts video signals R, G, and B at the input 12 to the corresponding digital data to the input to a gray corrector 16.

In gray corrector 16, a gray correction lookup table LUT-1 is set to function as correcting parameters such as a gray balance and a γ characteristic. The lookup table LUT-1 is a data table specifying input/output characteristics so as to produce output video signal data resultant from gray balance and γ characteristic correcting operations on an input video signal. Compensation is thereby made for differences caused by the illumination conditions under which an image represented by the input signals was shot. The correction signal is proportional to the optical density, and the correction is achieved for each individual image.

Figure 2A:
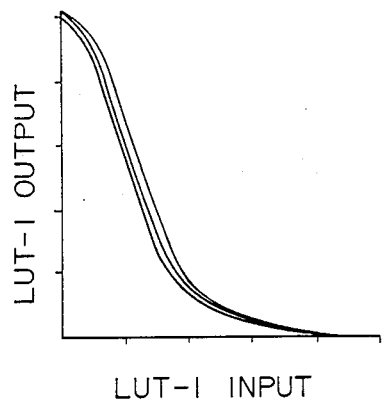
FIGS. 2A and 2B plot in an analog equivalent form examples of lookup tables for the gray correction and γ characteristic correction used in the embodiment of FIG. 1.
Figure 2B:
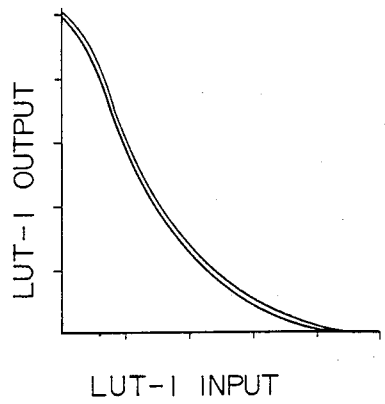

Consequently, image signal data for which the gray scale has been corrected to a target density is developed at 3-line output 20 of the gray corrector 16. FIG. 2A shows an example of the input-to-output characteristics. This graph plots data of a standard scene in which the gray balance is slightly lost and indicates that the gray corrector 16 stores table data developing such output characteristics for each input level. FIG. 2B plots an example of data of another standard scene in which the input gray balance is relatively well retained.

The output 20 from the gray corrector 16 is, on one hand, conveyed through a color corrector 22, a gradation corrector 24, and a digital-to-analog (D/A) conversion circuit 26 so as to be selectively delivered in an alternative fashion by switch 28 to a high-brightness monochromatic CRT 30 for recording data. In front of a display screen 32 of the CRT 30, there are disposed a lens 34 and three color decomposing or separating filters 36, so that an image displayed on the screen 32 is focused on color print paper 38.

In color corrector 22, a color correction matrix MTXA is set to correct parameters for compensation of differences between the hue characteristics of the signal source of the input video signal and a photosensitive material 38. For example, when the input signal source is a TV camera, the color correction matrix MXTA contains matrix coefficients for compensation of the hue characteristics of the TV camera and the print paprr 38. This causes an output 40 to develop a video output data which is corrected in hue to a target density.

Figure 3:
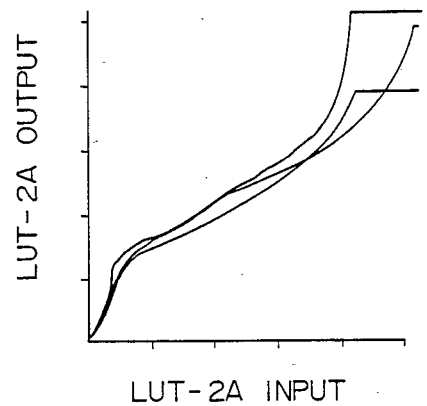
FIGS. 3 and 4 plot also in an analog equivalent form examples of lookup tables for a recording and monitor display used in the embodiment of FIG. 1.

The gradation corrector 24 contains a gradation correcting lookup table LUT-2A for correcting parameters for compensation of differences in gradation characteristics of the recording CRT 30 and the sensitized paper 38. FIG. 3 shows an example of input/output characteristics of the gradation correcting lookup table LUT-2A in its corresponding analog form. The gradation corrector 24 stores table data which develops such output characteristics for each input level.

The resultant video signal data corrected in gray balance, γ characteristic, hue, and gradation characteristics of the recording CRT 30 and the print paper 38 is fed from an output 42 of the gradation corrector 24 to the D/A converter 26, and is converted therein into a corresponding analog signal, which is then supplied via a switch 28 to the recording CRT 30. As indicated by the broken line, the change-over of the switch 28 is controlled by a control unit (CPU) 46 as described later. The switch 28 forms a selection circuit for alternatively selecting one of the three separated color signals R, G, and B at an output 44 to supply the selected signal to the recording CRT 30.

On the other hand, the output from the gray corrector 16 is also delivered to a color video monitor 54 via a color corrector 48, a gradation corrector 50, and a D/A conversion circuit 52.

In color corrector 48, a color correcting matrix MTXB is set to correct parameters for compensation of differences in hue characteristics of a signal source of the input video signal and a fluorescent material of display screen 56 of the video monitor unit 54. The color corrector 48 has an output 58 to produce a video signal data corrected in hue to a target density.

Figure 4:
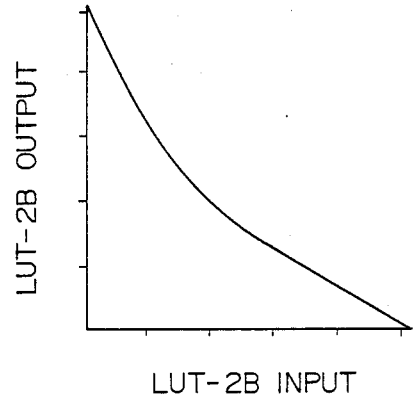

In gradation corrector 50, a gradation correcting lookup table LUT-2B is set to correct parameters for compensation of the gradation characteristics of the fluorescent material on the display screen 56 of the video monitor 54. FIG. 4 shows an example of input/output characteristics of the gradation corrector 50 in its corresponding analog form. Namely, table data developing such output characteristics for each input level is stored in this section 50.

The obtained video signal data corrected in gray balance, γ characteristic, hue, and gradation characteristic of the video monitor 54 is fed from an output 60 of the gradation coreector 50 to the D/A converter circuit 52 so as to be converted therein into a corresponding analog signal. The analog signal is then delivered to the video monitor 54 to be reproduced therein as a visual image on the display screen 56.

The control unit 46 is adapted to control the overall operation of this system and is advantageously configured by use of a processing system such as a microprocessor. The control unit 46 is connected to a storage 47 for storing parameters set for the lookup tables LUT-1, LUT-2A, and LUT-2B and the color correction matrices MTXA and MTXB.

The control unit 46 is further connected to an input operation unit 62 such as a keyboard to be used by an operator to select or correct image processing parameters such as the lookup table LUT-1 or to enter necessary instructions such as an instruction to record or print an image. The selection and correction of those parameters are conducted by manipulating the operation members of unit 62 to enter directions such as increasing or decreasing the optical density of the entire image, strengthening the red, green or blue tones, or making the red more brilliant.

Figure 5:
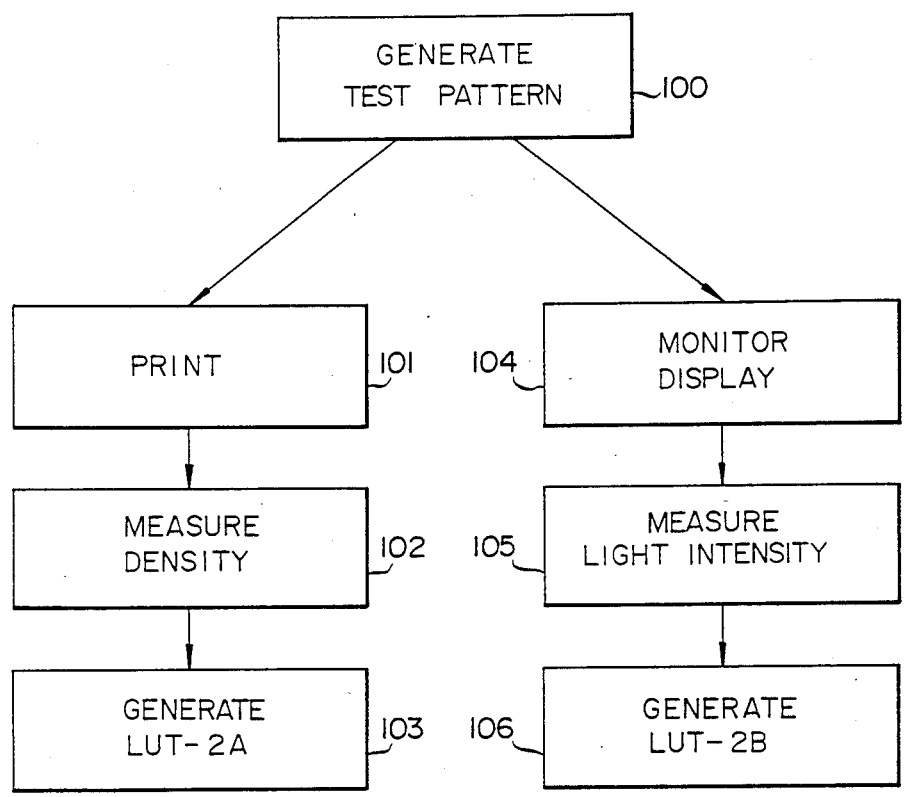
FIGS. 5 and 6 are operation flowcharts illustrating examples of procedures for initializing a lookup table and a matrix.

Incidentally, data of lookup tables LUT-1, LUT-2A, and LUT-2B are set from the central processing unit 46 into the correctors 16, 24, and 50. FIG. 5 illustrates an initialization of the lookup tables in a flow chart. At first, for the lookup tables LUT-2A and LUT-2B of the correctors 24 and 50, respectively, those having a uniform pattern to develop a fixed level regardless of the input are set in the correctors 24 and 50. Consequently, an image developed from the corrector 24, for example, is displayed on the screen 32 of the recording CRT 30 with a uniform pattern corresponding to that predetermined level (100). For that test pattern, or uniform pattern image, a single-color exposure is effected for each color of red, green and blue by selecting the filters 36 associated therewith, thereby producing a hard copy of the color image (101).

Those predetermined levels are prepared in multiple. For example, several levels are prepared with an equal interval therebetween. A hard copy is produced for each level by use of such a uniform test pattern to obtain a complete hard copy of the test pattern image for each level. In a system including a frame memory, a test pattern can be generated without using such a uniform pattern to create the lookup tables LUT-2A and LUT-2B; moreover, several steps of levels can also be set for one scene.

The optical density of the hard copy image is then measured (102) to determine parameters which match the measured density with the target density (103). This completes the gradation correcting lookup table LUT-2A for the sensitized paper 38 used for this operation.

Similarly, for the lookup table LUT-2B also, the test pattern (the uniform test pattern) is subjected to the single-color exposure for the red, green and blue, with the resultant signals delivered to the video monitor unit 54 (104).

The brightness of the image on the monitor screen 56 is then measured (104) to determine parameters which match the measured brightness with the target brightness (105). This completes the gradation correcting lookup table LUT-2B for the specific monitor unit 54.

Figure 6:
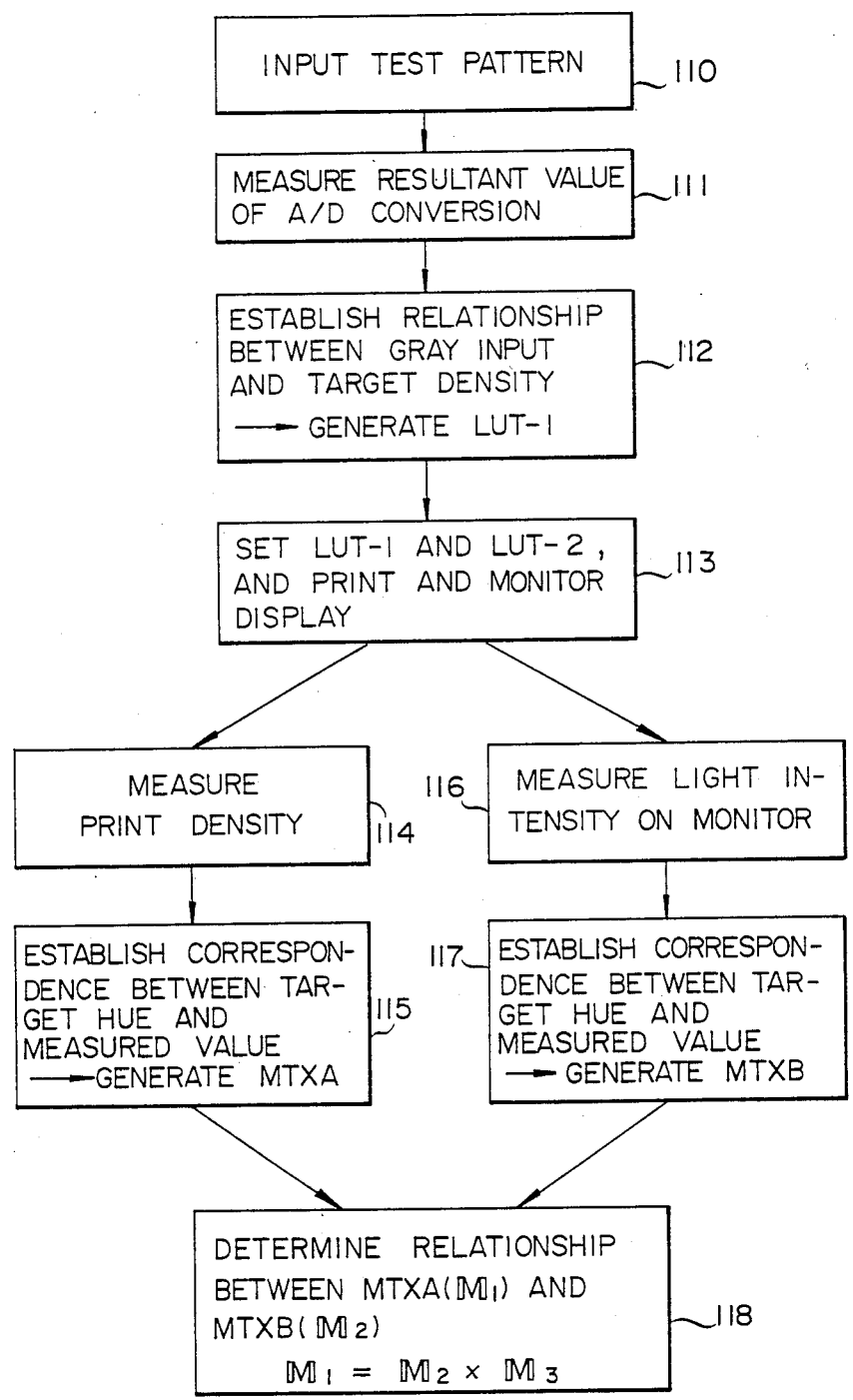

In the correctors 16, 22, and 48, the lookup table LUT-1, and the color matrices MTXA and MTXB are respectively set in a manner as shown in FIG. 6. First, a video signal representing a test pattern such as a gray scale chart is supplied to the input 12 (110). A data value on an output 18 of the A/D converter circuit 10 corresponding to the input video signal is then measured (111). Since the test pattern video signal has a known reflection factor of the standard image and hence a known target density of the print, the lookup table LUT-1 can be generated by use of relationships with respect to the target density of the gray input (112).

Next, the lookup tables LUT-1, LUT-2A, and LTT-2B thus obtained are respectively set to the correctors 16, 24 and 50, and then the video signal of a color chart or the like is visualized in print 38 and displayed on the monitor 54 (113). The density of the hard copy is then measured (114) and parameter values which correlate the measured density with the target density are determined to generate the color correction matrix MTXA (115). This completes the color correction matrix MTXA for the photosensitive paper 38 used for the print operation.

Furthermore, the brightness of the image on the monitor screen 56 is measured (116) and parameter values which make the measured brightness correspond to the target brightness are determined to generate the color correcting matrix MTXB (117). This completes the color correction matrix MTXB for the monitor unit 54.

Between both color correcting matrices MTXA (M1) and MTXB (M2) thus generated, there exists a predetermined relationship, which can be represented by a transforming matrix M3 (118).

The parameter values obtained for the lookup tables LUT-1, LUT-2A and LUT-2B, and the color correcting matrices MTXA and MTXB are stored in the storage 47. Incidentally, data for only two of three matrices M1, M2 and M3, need be stored in the storage 47.

An example of values of the elements of the color correcting matrix MTXA follows:

$$M1 = \begin{pmatrix} 1.37 & -0.34 & -0.03 \\ -0.46 & 1.67 & -0.21 \\ 0.06 & -0.40 & 1.34 \end{pmatrix}$$

This example applies to a case of a video signal produced from a particular 3-tube TV camera. In the matrix, the red, green and blue inputs are arranged from the left to the right, and the red, green and blue outputs are ordered from the top to the bottom.

When the color correcting matrix M1 is multiplied by the following transformation matrix M3, $$M3 = \begin{pmatrix} 0.69 & 0.26 & 0.05 \\ 0.23 & 0.74 & 0.03 \\ -0.03 & 0.37 & 0.66 \end{pmatrix}$$

the value of the elements of the color correcting matrix M2 is obtained as follows, for example.

$$M2 = \begin{pmatrix} 0.83 & 0.18 & -0.01 \\ -0.02 & 1.15 & -0.12 \\ -0.17 & 0.36 & 0.81 \end{pmatrix}$$

The transformation matrix M3 is determined by the pigment or dye materials of the print paper 38, the spectroscopic sensitivity characteristic of the TV camera used for the input signal, and the characteristics of the fluorescent material on the display screen 56 of the monitor unit 54.

Figure 7:
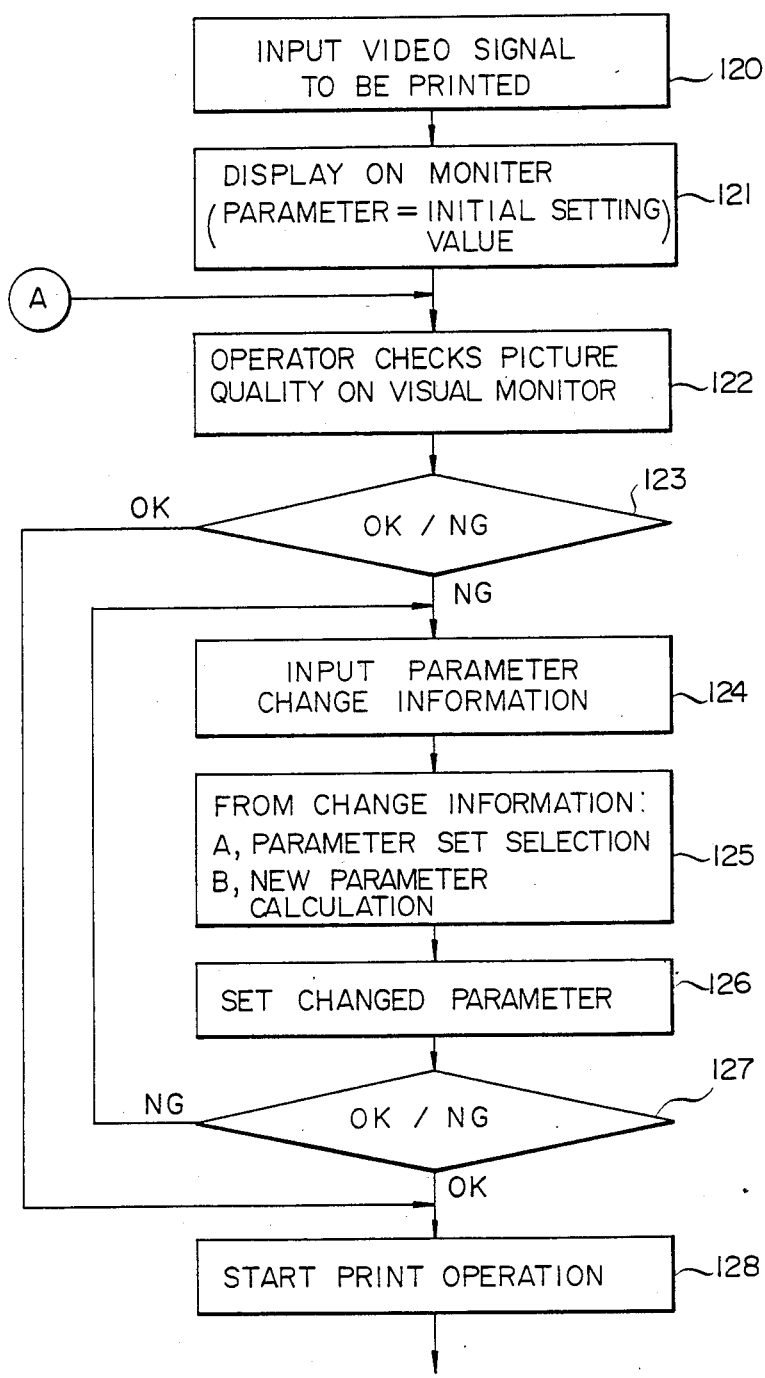
FIG. 7 is an operation flowchart showing an example of a procedure for manually setting image processing parameters.

FIG. 7 shows an operational flowchart of an operation of the apparatus of this embodiment in which the image processing parameters are manually set to generate a hard copy. First, by manipulating the operation unit 62, the lookup table LUT-1, the color correcting matrices MTXA-MTXB, and the lookup tables LUT-2A and LUT-2B containing appropriate image processing parameter values are set in the correctors 16, 22, 48, 24 and 50, respectively. A video signal of an image to be printed is supplied to the input 12 (120). This signal is visualized on the monitor unit 54 (121). The operator checks and evaluates the quality of the image displayed on the monitor unit 56 (122, 123). If the quality of the picture is satisfactory, the operator inputs a print instruction from the console 62 to print the image without change (128).

In reply to the print instruction, the control unit 46 sequentially changes over the switch 28 and sequentially installs the filters 36 in a selective fashion to disable the blanking of the recording CRT 30 for a predetermined period of exposure time, thereby recording the images associated with the three separated colors on the same frame of the print paper 38. This completes the recording of a frame of color image on the photosensitive paper 38.

If the picture image is not satisfactory, the operator manipulates the console 62 to instruct a change of parameter values to be set to the corrector circuits (124). Based on the change instructions, the control unit 46 selects a set of appropriate parameters among the parameter sets stored in the storage 47. If such an appropriate parameter set is missing, a new parameter set is calculated therefor (125).

The obtained parameters are set into the gray corrector 16, the color correctors 22 and 48, and the gradation correctors 24 and 50 (126). In this operation, the coefficients of the color correction matrices MTXA and MXTB are related to each other, as are the lookup tables LUT-2A and LUT-2B. For example, when a set of coefficient values are selected for the matrix M1 to be set in the color corrector 22, a set of coeffieients M2 are obtained by multiplying the matrix M1 by the transforming matrix M3 and are set in the color corrector 48.

While observing the monitor image on the monitor unit 54, the operator judges whether or not the quality of the image is acceptable. If acceptable, the operator inputs a print instruction from the console 62; otherwise, he or she enters further change instructions of parameter values from the console 62.

Whenever an acceptable picture quality is developed on the monitor screen 56, hard copy will be recorded from the recording CRT onto the print paper 38 with a corresponding satisfactory quality. This is because there exists a predetermined correspsondence between the parameter values set in the color correction matrix MTXA and the lookup table LUT-2A for the print operation, and those set in the color correction matrix MTXB and the lookup table LUT-2B for the monitor operation.

Figure 8:
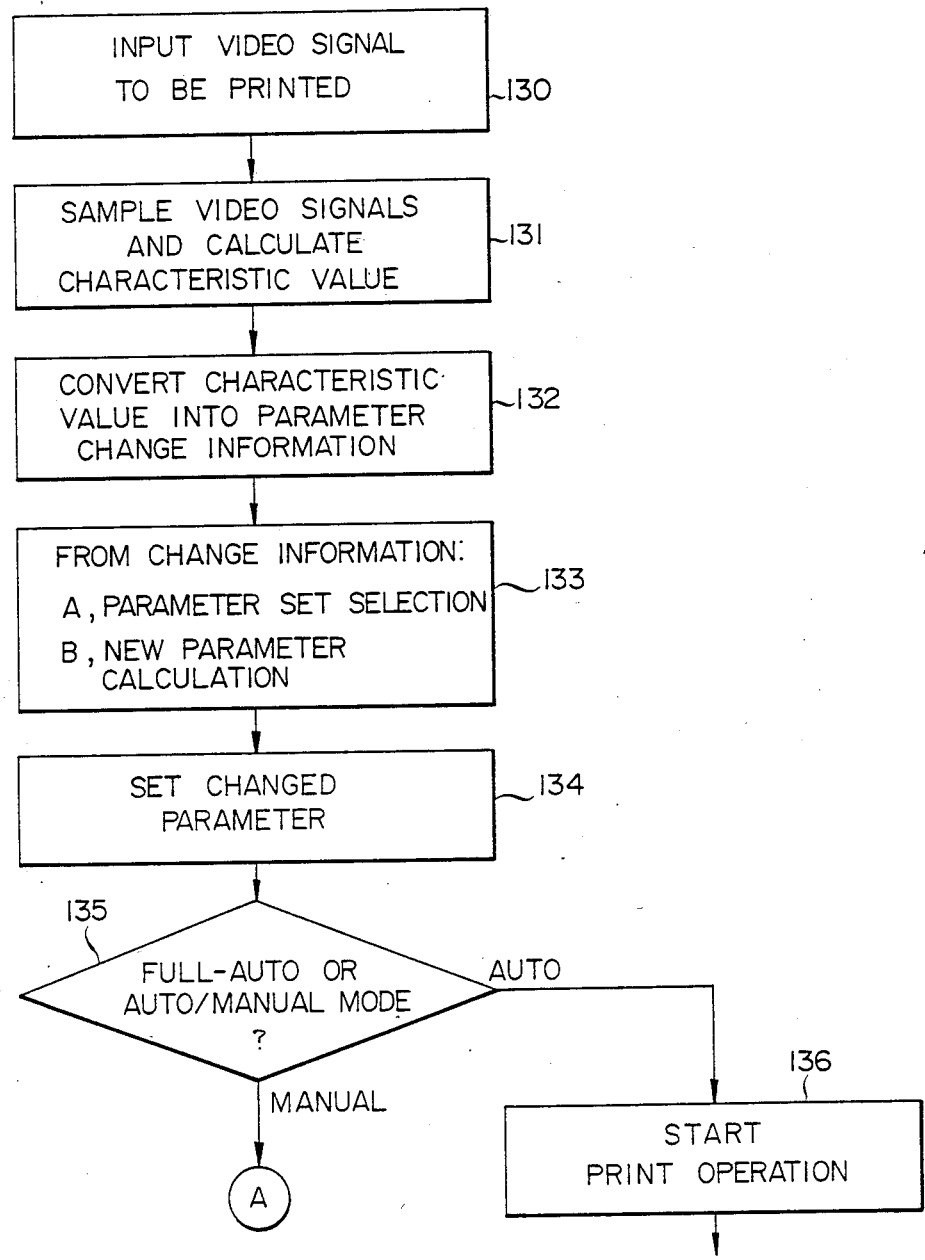
FIG. 8 is an operation flowchart illustrating an example of a procedure for automatically/manually setting image processing parameters.

Returning now to FIG. 1, the system may be configured such that the output 18 from the A/D converter circuit 10 is supplied to a sampling circuit 70, which effects a sampling on the video signal data to deliver the obtained signal to the control unit 46. The sampling circuit 70 has a function to sample optical density data at predetermined sampling points in an image represented by the video signal to deliver the resultant signal to the control unit 46. FIG. 8 shows an operation flow used to automatically set such parameters.

FIG. 8 is a flowchart illustrating an example of automatic/manual setting of parameters in which manual operations are selectable in the automatic sequences. At first, a video signal to be visualized in print is supplied to the input 12 of this apparatus (130). The signal is in turn converted into digital data by the A/D converter circuit 10 to be delivered to the gray conductor 16 and also to the sampler 70. The sampler 70 samples the density values at predetermined sampling points, and the control unit 46 then calculates a characteristic value based on the sampled values (131). The characteristic value may be an integral average value, a peak value, or a histogram value. The calculated characteristic value is converted into parameter change information (132). Namely, this operation generates instructions to increase or decrease the density or the contrast, or to intensify red and green, for example.

Based on the change information, the control unit 46 selects an appropriate one of the parameter sets stored in the storage 47, or otherwise calculates a new set of parameters (133). Those parameters are set into the gray corrector 16, the color correctors 22 and 48, and the gradation correctors 24 and 50 (134). If the full-automatic mode has been set through the operation unit 62 in this case, the print starts in operation at this point (136). If the auto/manual mode has been specified, control is transferred to the step 122, FIG. 7, for evaluating the picture quality through observation of the monitor screen 56, and then an operation flow identical to the operation flow in the manual mode is executed.

Figure 9:
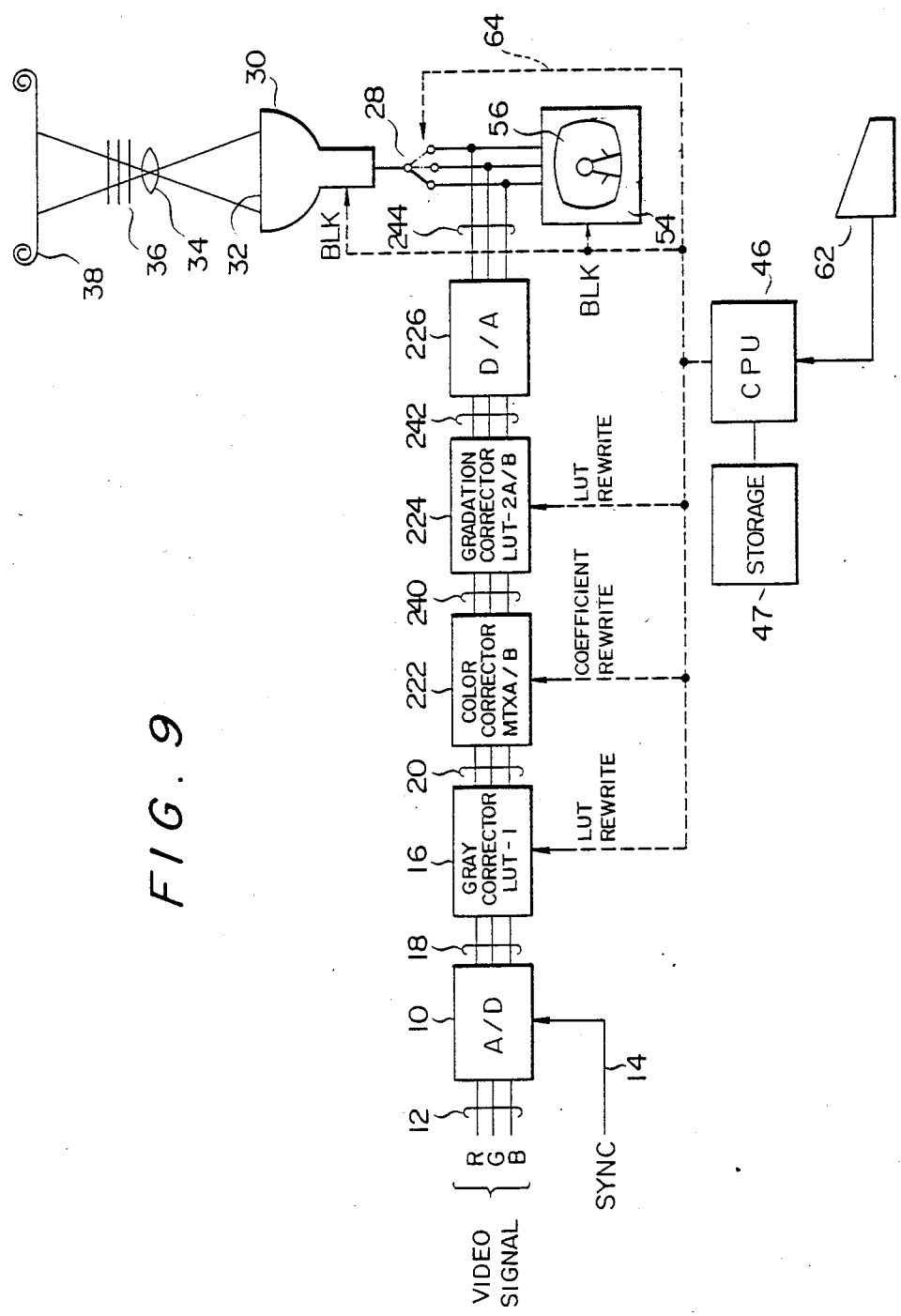
FIG. 9 is a schematic block diagram, similar to FIG. 1, of an alternative embodiment of the present invention.

Referring now to FIG. 9 showing an alternative embodiment of the present invention, the output 20 from the gray corrector 16 of the embodiment shown in FIG. 1 is supplied via a color corrector 222, a gradation corrector 224, and a D/A converter circuit 226 to the switch 28 on one hand and to the video monitor unit 54 on the other hand. In FIG. 9, the same reference numerals are assigned to the components similar to those of FIG. 1.

Parameters from the color correction matrix MTXA or MTXB are selectively set into the color corrector 222 from the control unit 46. The corrector 222 is adapted to correct hue in recording on the print paper 38 or in display on the video monitor screen 56. The gradation correcting lookup table LUT-2A or LUT-2B is selectively set into the gradation corrector 224 from the control unit 46. The gradation corrector 224 achieves correction of gradation in recording on the print paper 38 or in display on the video monitor screen 56.

In this example, when reproduction on video monitor 54 is instructed from the console 62, the control unit 46 sets the color correction matrix MTXB and the lookup table LUT-2B for the video monitor in the color corrector 222 and the gradation corrector 224, respectively. During this switching operation, the control unit 46 effects blanking operation on the video monitor unit 54. The gray correcting lookup table LUT-1 is set in the gray corrector 16.

When a recording instruction is received from the console unit 62, the control unit 46 also sets the color correction matrix MTXA and the lookup table LUT-2A in the color corrector 222 and the gradation corrector 224, respectively. The set of parameters, set in correctors 222 and 224 this time, includes the parameter values associated with those used for the monitor operation when the image is displayed on the video monitor unit 54. The gray correction lookup table LUT-1 is retained in the gray corrector 16. In this state, the video monitor 54 is being blanked by the control circuit 46.

In the case where the control unit 46 is used to rewrite data stored in the correctors 16, 222, and 224 under the conditions that each gradation of three primary colors is represented in 256 levels by eight bits, if the data transfer speed is 500K bytes per second in the DMA mode or the memory block-transfer mode, the data of those correctors can be completely rewritten in a period of about 60 ms.

Only if the monitoring parameter values have been set in the correctors 16, 222, and 224, the video monitor 54 is controlled by the control unit 46 so as to interrupt the blanking operation and is therefore enabled to output the video signal. Only when the printing parameter values are set in the correctors 16, 222, and 224 to expose the print paper 38, the recording CRT 30 is controlled by the control circuit 46 so as to interrupt the blanking operation for a predetermined amount of time.

In the embodiment of FIG. 9, when an image is to be displayed on the video monitor 54, the values of parameters for monitoring are set to the correctors 222 and 224. By determining the quality of the picture viewed on the monitor unit 54, if the operator inputs a parameter change instruction from the console 62, the control unit 46 rewrites in response thereto the matrix MTXB of the color corrector 222 and the lookup table LUT-2B of the gradation corrector 224 for the monitor display.

When the monitor image becomes of acceptable quality, the operator enters a print instruction from the operator's console 62. In response to the print instruction, the control unit 46 writes the recording matrix MTXA and the recording lookup table LUT-2A into the color corrector 222 and the gradation corrector 224, respectively. The values of those parameters are selected so as to correspond with predetermined relationships to the matrix MTXB set to the color corrector 222 and the lookup table LUT-2B set in the gradation collector 224. The print operation is thereafter conducted on the photosensitive paper 38.

As described above, according to the present invention, the image processing parameters determined in accordance with the characteristics of a video monitor and the image processing parameters determined in accordance with the characteristics of an image recording medium are prepared. An image is displayed on the video monitor by use of the parameters for the monitor display, and recording parameters having predetermined relationships with the monitor-display parameters are selected, thereby recording an image on the image recording medium. This results in a hard copy with a picture quality exactly matching the picture quality of the monitor image. Consequently, unfavorable work on printing, such as a print operation of a picture with unacceptable picture quality, will be minimized, an experienced skill is not required in determining the quality of a printed image from that of the monitor image, and other various advantages are obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An image recording apparatus comprising:
    image processing means for processing an input video signal from a video signal source;
    recording means for recording the processed video signal on a photo sensitive material;
    display means for displaying an image represented by the processed video signal;
    storage means for storing a first image processing parameter determined according to a sensitivity characteristic of the photosensitive material and a second image processing parameter determined according to a display characteristic of said display means;
    input means for receiving instructions; and
    control means responsive to instructions received by said input means for controlling said image processing means, said recording means, said display means, and said storage means;
    said control means setting values of the second image processing parameter in said image processing means to cause said display means to display an image, and setting values of the first image processing parameter having a predetermined relationship to said set second image processing parameter in said image processing means, to cause said recording means to effect a printing operation on the photosensitive material to print an image with a picture quality equal to the image displayed on said display means.

2. An image recording apparatus according to claim 1 wherein said control means changes the values of the image processing parameters to be set in said image processing means in response to instructions received by said input means.

3. An image recording apparatus according to claim 2 wherein,
    said image processing means includes:
    first image processing means for processing a video signal of an image to be recorded on the photosensitive material by said recording means; and
    second image processing means for processing a video signal of an image to be displayed on said video display means,
    said control means setting the first image processing parameter in said first image processing means, and setting the second image processing parameter in said second image processing means.

4. An image recording apparatus according to claim 2 wherein,
    said image processing means processes input video signals to be displayed and to be recorded,
    said control means, when displaying an image on said video display means, setting the second image processing parameter in said image processing means, and, when said recording means performs a recording operation on the photosensitive material, replacing the values of the second image processing parameter set in said image processing means with the values of the first image processing parameter having said predetermined relationship with said second image processing parameter.

* * * * *